(12) United States Patent
Dewar et al.

(10) Patent No.: US 9,413,205 B2
(45) Date of Patent: Aug. 9, 2016

(54) DRIVE ARRANGEMENT FOR A WIND TURBINE

(75) Inventors: Alan Bradley Dewar, Huddersfield (GB); Scott Douglas Edmondson, Huddersfield (GB); Scott Tran, Huddersfield (GB)

(73) Assignee: David Brown Wind UK Limited, Huddersfield (GB)

( * ) Notice: Subject to any disclaimer, the term of this patent is extended or adjusted under 35 U.S.C. 154(b) by 277 days.

(21) Appl. No.: 14/236,677

(22) PCT Filed: Aug. 3, 2012

(86) PCT No.: PCT/GB2012/051893
§ 371 (c)(1),
(2), (4) Date: Jun. 18, 2014

(87) PCT Pub. No.: WO2013/021181
PCT Pub. Date: Feb. 14, 2013

(65) Prior Publication Data
US 2014/0378260 A1 Dec. 25, 2014

(30) Foreign Application Priority Data
Aug. 5, 2011 (GB) .................................. 1113571.2

(51) Int. Cl.
*H02K 7/116* (2006.01)
*F16H 1/28* (2006.01)
*F16H 1/46* (2006.01)

(52) U.S. Cl.
CPC ................ *H02K 7/116* (2013.01); *F03D 15/00* (2016.05); *F03D 80/70* (2016.05); *F16H 1/2818* (2013.01);

(Continued)

(58) Field of Classification Search
CPC ................ F16H 1/48; F16H 2001/289; F16H 2057/02034; F16H 2057/02078; F16H 57/022; H02K 7/116
See application file for complete search history.

(56) References Cited

U.S. PATENT DOCUMENTS

| 4,848,188 A | * | 7/1989 | Schumacher | ...................... 475/5 |
| 2008/0026902 A1 | * | 1/2008 | Willie | ........................... 475/331 |

(Continued)

FOREIGN PATENT DOCUMENTS

| DE | 10 2006 049 709 A1 | 4/2008 |
| DE | 10 2009 040 479 A1 | 4/2010 |

(Continued)

OTHER PUBLICATIONS

Bedford, L.A.W., et al., "The 3MW Wind Turbine Project on Orkney 1981-1995," ETSU-R-95, edited by Dr. D. I. Page, Jan. 1996, Title page, Fig. 9.1, and p. 49.

(Continued)

*Primary Examiner* — Huan Le
(74) *Attorney, Agent, or Firm* — Stoel Rives LLP

(57) ABSTRACT

A drive arrangement (12) for a wind turbine (10) is disclosed, having a rotor shaft (20) and a gearbox assembly (22) for transferring torque to an electrical power generator (18). The gearbox assembly comprises an input shaft (40), an output shaft (42), a primary gear stage (44) and a secondary gear stage (46). The drive arrangement also comprises a drive transfer mechanism (24) for transferring torque from the rotor shaft into the gearbox assembly via the input shaft, and a primary load carrying member (56) for releasably mounting the gearbox assembly to a housing (34) of the turbine. The rotor shaft is at least partly hollow, having an internal cavity (28) in which at least parts of the gearbox assembly and drive transfer mechanism are located. The gearbox assembly is mountable within the rotor shaft as a single unit by the primary load carrying member.

30 Claims, 10 Drawing Sheets

(52) U.S. Cl.
CPC ......... *F16H 1/46* (2013.01); *F05B 2260/40311* (2013.01); *Y02E 10/721* (2013.01); *Y02E 10/722* (2013.01)

(56) References Cited

U.S. PATENT DOCUMENTS

| | | | |
|---|---|---|---|
| 2010/0009803 A1 | 1/2010 | Giger | |
| 2011/0068583 A1 | 3/2011 | Burkart | |
| 2012/0299416 A1* | 11/2012 | Chen ............................... | 310/83 |
| 2013/0324354 A1* | 12/2013 | Phebus et al. ................. | 475/348 |

FOREIGN PATENT DOCUMENTS

| | | |
|---|---|---|
| EP | 1 677 032 B1 | 7/2006 |
| EP | 2 055 986 A2 | 5/2009 |
| EP | 1 910 708 B1 | 1/2010 |
| EP | 2 187 091 A1 | 5/2010 |
| EP | 1 673 553 B1 | 7/2011 |
| EP | 2 126 354 B1 | 10/2012 |
| FR | 1 526 352 A | 5/1968 |
| GB | 2 384 836 B | 10/2003 |
| WO | WO 2005/050059 A1 | 6/2005 |
| WO | WO 2007/016336 A2 | 2/2007 |
| WO | WO 2008/104257 A1 | 9/2008 |
| WO | WO 2008/104258 A1 | 9/2008 |
| WO | WO 2009/049599 A2 | 4/2009 |
| WO | WO 2009/049599 A3 | 4/2009 |
| WO | WO 2009/134684 A1 | 11/2009 |
| WO | WO 2009/141140 A2 | 11/2009 |
| WO | WO 2009/152306 A1 | 12/2009 |
| WO | WO 2010/005790 A2 | 1/2010 |
| WO | WO 2010/005790 A3 | 1/2010 |

OTHER PUBLICATIONS

International Preliminary Report on Patentability for PCT/GB2012/051893 filed Aug. 3, 2012, and mailed from the International Bureau on Feb. 20, 2014, 40 pgs.

International Search Report and Written Opinion for PCT/GB2012/051893 filed Aug. 3, 2012, and mailed from the International Searching Authority on Dec. 21, 2012, 10 pgs.

* cited by examiner

DRIVE ARRANGEMENT FOR A WIND TURBINE

CROSS-REFERENCE TO RELATED APPLICATIONS

This application is a national stage application under 35 U.S.C. §371 of International Application No. PCT/GB2012/051,893, titled A DRIVE ARRANGEMENT FOR A WIND TURBINE, filed Aug. 3, 2012, which claims priority to Great Britain Application No. 1,113,571.2, filed Aug. 5, 2011, both of which are hereby incorporated by reference in their entireties.

The present invention relates to a drive arrangement for a wind turbine, and to a wind turbine incorporating a drive arrangement. In particular, but not exclusively, the present invention relates to a drive arrangement comprising a rotor shaft, a gearbox assembly for transferring torque from the rotor shaft to an electrical power generator, and a drive transfer mechanism for transferring torque from the rotor shaft into the gearbox assembly.

Significant efforts are being made worldwide to capitalise on renewable energy sources. One particular area in which there has been much research is in the field of wind power generation. A wide variety of different types of wind power generation machines have been developed. As is well known, these machines are generally referred to as wind turbines, and comprise a rotor having two or more blades, an electrical power generator and often have a drive arrangement for transferring torque from the rotor to the generator. The drive arrangement comprises a rotor shaft coupled to the blades and a gearbox. The drive arrangement and the generator are contained within a streamlined nacelle, which is mounted on an elongate tower that may be many tens of metres in height. Other types are 'direct drive', where the rotor shaft is connected directly to the generator.

In larger turbines, the rotor speed is limited by the acceptable tip speed of the blades. Consequently, rotor speeds become lower as blades became longer, power captured being proportional to blade disc diameter squared. As a result of this, the rotational speed of the turbine rotor in such larger turbines is relatively low, and the torque in the rotor shaft is relatively high. It is therefore necessary to increase the rotational speed and reduce the torque prior to input of the rotational load into the generator. This is because conventional generators cannot operate effectively at such low speeds and high torques. The torque is thus transferred through a gearbox, which is coupled to the rotor shaft, and which has an output shaft coupled to the generator. The rotational speed of the gearbox output shaft is significantly higher than that of the rotor shaft which provides the input to the gearbox, and the torque in the output shaft is significantly lower. Direct drive generators are known, which can be made to be efficient, but they are relatively large and heavy. Like for like, on basis of power, a geared turbine will be significantly lighter, smaller and of lower cost than a direct drive system, which is the usual reason for selection of a geared turbine design.

The components of such conventional wind turbines have typically been connected in series in the order rotor-rotor shaft-gearbox-generator. Connecting components are provided between the rotor shaft and the gearbox input shaft, and similarly between the gearbox output shaft and the generator. Arrangements of bearings are also required to support the significant bending moment and shear forces experienced by the rotor during use. As a result, the drive arrangements of many prior wind turbines are relatively long and heavy, particularly due to the bulky and heavy connecting components provided between the various shafts and the physically separate and series arrangement of these in the nacelle. As a consequence, the nacelle of the wind turbine is relatively large and heavy. It is generally undesirable to have such a large nacelle located at height on the wind turbine tower. This requires the tower to support relatively high static and dynamic loadings. Additionally, the wind loading on the nacelle can be high, and this must also ultimately be supported by the tower. Thus nacelle weight and size drives tower and foundation design, a major driver of turbine system cost overall.

Furthermore, the drive arrangements, in particular the gearboxes, have historically required regular servicing. This is due particularly to the extremely variable nature of the torque loads which the rotor exerts on the gearbox as a function of wind conditions. Additionally, high shear forces and bending moments can be exerted on the gearbox by the rotor, leading to premature wear and fatigue damage.

It can however be difficult to service the gearboxes of existing turbines. Typically, the gearboxes are removed for repair off-tower, as there is limited access to the gearbox in the nacelle. The prevailing environmental conditions and need for special and in some cases substantial tooling and test equipment are associated barriers to up-tower repair. It has been found to be relatively difficult to remove the gearboxes in some cases, due to their size, weight and the way in which they are mounted within the nacelle and coupled to the rotor shaft and generator. In certain turbines, the gearbox partially or fully supports the rotor and so removal of the gearbox requires that separate support be provided to support the rotor, or its removal. Maintenance of the drive arrangements of existing turbines can therefore be time-consuming and expensive.

US Patent Publication No. US-2010/0009803 (Giger) discloses a wind power turbine and gearbox. The turbine comprises a rotor shaft 3 which is of a hollow form, and the gearbox is partly arranged in an interior of the shaft. The gearbox is a parallel shaft and planetary gearbox having two stages inside the rotor shaft, these forming primary and secondary stages. The secondary stage has a planet gear carrier which carries a number of planet gears on mountings which are elastically deformable. A ring (or annular) gear of the secondary stage is part of a coupling member which constitutes a sun gear of the secondary stage. A sun shaft runs backwards out of the rotor shaft through a torque support, and is coupled to an offset generator. Planet gears of the primary stage are mounted on a second gear carrier formed by the torque support, and a ring gear of the primary stage is formed directly on the inside of the hollow rotor shaft.

Removal of the gearbox assembly disclosed in Giger from the turbine housing is difficult. In particular, the primary and secondary stages cannot be removed from the housing together with the sun shaft, and having several interfaces, must be removed separately. In particular, the way in which the secondary stage planet gear carrier is mounted relative to the rotor shaft, and the ring gear formed on the inside of the rotor shaft, is such that the gearbox assembly must be removed in sections, rather than as a single unit. This is challenging and highly time-consuming.

Another problem with known gearbox assemblies concerns gear tooth distortion. Epicyclic gear stages comprise an annular gear meshed with planet gears and arranged to transfer torque to the planet gears. The planet gears mesh with a sun gear to transfer drive to an output shaft. The gearbox assemblies are arranged so that torque is transferred to the annular gear at a first axial end. Transferring the torque to the annular gear in this way can result in distortion or 'twisting' of the planet teeth in a direction around a circumference of the planet gears, which is known in the industry as 'wind-up'. This has conventionally been addressed by either: 1) constructing a centre-drive arrangement, where drive is transferred on to the annular gear, and from the planet gears to the sun gear, at a point which is midway along the length of the gears; and/or 2) shaping the gear teeth on the planet and sun gears so that they vary in circumferential width, tapering along their length so as to allow for the distortion. In the case of 1), this can add significantly to the dimensions, weight and complexity of the gearbox assembly. In the case of 2), this significantly complicates the design and manufacturing processes.

It is amongst the objects of at least one embodiment of the present invention to obviate or mitigate at least one of the foregoing disadvantages.

According to a first aspect of the present invention, there is provided a drive arrangement for a wind turbine, the drive arrangement comprising:
- a rotor shaft;
- a gearbox assembly for transferring torque from the rotor shaft to an electrical power generator, the gearbox assembly comprising:
    - an input shaft;
    - an output shaft;
    - a primary gear stage; and
    - a secondary gear stage;
        - each gear stage having a plurality of planet gears positioned around the output shaft, an annular gear meshed with the planet gears, and a sun gear meshed with the planet gears and arranged to transfer torque to the output shaft;
- a drive transfer mechanism for transferring torque from the rotor shaft into the gearbox assembly via the input shaft; and
- a primary load carrying member for releasably mounting the gearbox assembly to a housing of a wind turbine;
- wherein the rotor shaft is at least partly hollow, having an internal cavity in which at least part of the gearbox assembly and at least part of the drive transfer mechanism are located;
- and wherein the gearbox assembly comprising the input shaft, output shaft, primary and secondary gear stages is mountable within the rotor shaft as a single unit by means of the primary load carrying member.

The primary load carrying member may thereby facilitate positioning of the rotor shaft within a nacelle carrying the drive arrangement in such a way that the gearbox assembly can be more easily removed (as a unit).

According to a second aspect of the present invention, there is provided a drive arrangement for a wind turbine, the drive arrangement comprising:
- a rotor shaft;
- a gearbox assembly for transferring torque from the rotor shaft to an electrical power generator; and
- a drive transfer mechanism comprising a flexible connector extending between the rotor shaft and the gearbox assembly for transferring torque from the rotor shaft into the gearbox assembly;
- wherein the rotor shaft is at least partly hollow, having an internal cavity in which at least part of the gearbox assembly and at least part of the drive transfer mechanism are located;
- and wherein the flexible connector is elastically deformable such that, in use, it permits distortions of the rotor shaft relative to the gearbox assembly resulting from rotor bending or shear loads of at least around 0.1°, to thereby reduce the transmission of said loads into the gearbox assembly.

The flexible connector may have a first end and a second end opposite the first end, and may be secured to the rotor shaft at the first end and to the gearbox assembly at the second end. The flexible connector may be provided integrally with the rotor shaft and may extend from the shaft towards the gearbox assembly, the flexible connector having a free end which can be coupled to the gearbox assembly. The flexible connector may be elastically deformable such that, in use, it deflects about a main axis to reduce the transmission of rotor bending and shear loads into the gearbox assembly. The flexible connector may be capable of supporting distortions of the rotor shaft relative to the) gearbox assembly of up to around 0.2° or greater. The flexible connector may be a flange extending in a radial direction from the rotor shaft towards the gearbox assembly. The flexible connector may be corrugated, and may extend in an axial direction between mounting shoulders on the rotor shaft and the gearbox assembly, corrugations of the connector deforming to reduce transmission of the rotor loads into the gearbox assembly.

The drive arrangement of the second aspect of the invention offers significant advantages over prior arrangements, such as that disclosed in US-2010/0009803 (Giger). In particular, Giger employs a gearbox which is arranged so that there is an extremely stiff connection between the rotor shaft and the gearbox. This stiff connection ensures that rotor bending and/or shear loads are transmitted directly into the gearbox. In other words, distortion of the rotor shaft is felt by the gearbox assembly. Giger acknowledges this, but attempts to account for the problem by mounting the planetary gears on flexible pins. This is a compromise solution though, which will lead to higher loads on the gearbox assembly, premature gear wear and undesirable loads on the flexible pins and bearing assemblies.

The gearbox assembly of the first aspect of the invention may be arranged within the rotor shaft such that a radial gap exists between an internal surface of the rotor shaft and an external surface of the annular gear of said gear stage, to provide the drive arrangement with a degree of freedom to move, to account for rotor shaft deflections during use. The gearbox assembly of the first aspect of the invention may comprise a drive transfer mechanism having a flexible connector extending between the rotor shaft and the gearbox assembly for transferring torque from the rotor shaft into the gearbox assembly, and the flexible connector may be elastically deformable such that, in use, it permits distortions of the rotor shaft relative to the gearbox assembly resulting from rotor bending or shear loads of at least around 0.1°, to thereby reduce the transmission of said loads into the gearbox assembly.

The gearbox assembly of the second aspect of the invention may comprise primary and secondary gear stages; and a primary load carrying member for releasably mounting the gearbox assembly to a housing of a wind turbine; in which the gearbox assembly comprising the output shaft, primary and secondary gear stages is mountable within the rotor shaft as a single unit by means of the primary load carrying member.

According to a third aspect of the present invention, there is provided a drive arrangement for a wind turbine, the drive arrangement comprising:
- a rotor shaft;
- a gearbox assembly for transferring torque from the rotor shaft to an electrical power generator; and
- a drive transfer mechanism for transferring torque from the rotor shaft into the gearbox assembly;

wherein the rotor shaft is at least partly hollow, having an internal cavity in which at least part of the gearbox assembly and at least part of the drive transfer mechanism are located.

The following advantages and features may apply to the drive arrangements of the first, second and/or third aspects of the invention.

Providing a drive arrangement including a rotor shaft which is hollow, with a gearbox assembly at least partly located in a cavity in the shaft, offers numerous advantages over prior drive arrangements. In particular, the length of the drive arrangement can be significantly reduced. It is also not necessary to provide large and heavy connecting components between the rotor shaft and the gearbox assembly. These factors can lead to a reduction in the weight of the drive arrangement, and thus of a nacelle carrying the drive arrangement provided at height on a wind turbine tower. Additionally, a reduction in the length of the drive arrangement results in a reduction in the length of a nacelle carrying the drive arrangement, which may lead to reduced wind loading on the nacelle. This can lead to benefits in terms of a lighter tower design and smaller tower foundations. Furthermore, the rotor shaft can be supported within a nacelle carrying the drive arrangement in such a way that the gearbox assembly can be more easily removed or disassembled in situ, for example, for servicing. The invention may enable this to be achieved without requiring separate components to be provided for supporting the rotor shaft following removal of the gearbox assembly. Furthermore, locating at least part of the gearbox assembly and the drive transfer mechanism within an internal cavity of the rotor shaft enables a lubrication system for the gearbox to be used to lubricate main shaft bearings of the rotor, simplifying the overall lubrication system design for the turbine.

The gearbox assembly may have an external surface and an axial length, and may be located within the cavity in the rotor shaft in such as way that the rotor shaft extends around the external surface along at least part of the axial length of the gearbox assembly. A majority of the gearbox assembly may be located in the cavity in the rotor shaft. A majority of component parts of the gearbox assembly may be located within the cavity. Part of the gearbox assembly may protrude from the cavity in the rotor shaft. At least part of an output shaft of the gearbox assembly may protrude from the cavity. This may facilitate connection of the output shaft to a generator. The cavity in the rotor shaft may extend in an axial direction from a downwind end of the rotor shaft. The cavity may extend part way along a length of the shaft, or may extend along the entire length of the shaft. The output shaft may be a single or unitary component, or may comprise separate shaft sections or components which are rotatably coupled to transfer torque to a generator coupled to the gearbox. For example, each gear stage may have its own shaft section or component which are rotatably coupled.

The gearbox assembly may comprise a primary gear stage and a secondary gear stage, each comprising a plurality of planet (epicyclic) gears positioned around the output shaft, each planet gear rotatably mounted on a respective planet gear pin and arranged to transfer torque to the output shaft. The primary stage may be a star arrangement where a planet carrier is fixed and thus stationary, and the secondary stage may be planetary or star. It will be understood that the gearbox assembly components may rotate about their own axes and/or may follow an orbital path about a main axis of the gearbox, or may be secured against rotation. This will depend upon the chosen architecture or operating configuration for the drive arrangement. The torque of the rotor shaft inputted to the gearbox assembly may be split between the primary and secondary gear stages. The primary gear stage may be arranged to transfer its portion of the rotor shaft load to the output shaft through the secondary gear stage. The primary gear stage may be arranged to perform a primary speed increase/torque decrease on the portion of the rotor load inputted to the primary stage. The secondary gear stage may be arranged to perform a secondary speed increase/torque decrease on the load inputted to the secondary stage, which may be a combination of a portion of the rotor shaft load transferred directly into the second stage, and the output of the primary gear stage.

The drive transfer mechanism may comprise a primary drive element for connecting the rotor shaft to the gearbox assembly, to transfer the rotational drive force or load (torque) from the rotor shaft into the gearbox assembly. The gearbox assembly may comprise an input shaft which can be coupled to the primary drive element, the input shaft being arranged to transfer the drive force from the primary drive element into the primary and secondary gear stages. The primary drive element may be secured to the rotor shaft. The input shaft may be secured to the gearbox assembly.

The primary drive element and the input shaft may be coupled together in a floating or compliant connection. This may reduce the transmission of undesired loads into the gearbox assembly, particularly bending moments and shear forces exerted by the rotor. This may reduce the likelihood of damage to the gearbox components during use. The mechanism may comprise a splined connection for transferring the rotational drive force from the rotor shaft into the gearbox assembly. The splined connection may comprise axially extending male splines provided on the input shaft and axially extending female splines provided on the primary drive element and which mesh with the male splines. The provision of such a splined connection may facilitate location of the gearbox assembly within the rotor shaft cavity, and indeed removal of the gearbox assembly. The heights of the male splines may vary along a length of the splines (although the splines will typically be of a constant depth from root to tip). The male or female splines, and typically the male splines, may taper (optionally non-linearly) in directions from a mid or central portion of the splines towards each end of the splines. The splines may be of greatest radial height in the mid-portion and of least radial height at the ends. The splines may have curved profiles and may be barrelled (viewing radially) or crowned (viewing side-on). The crowned splines may allow a degree of relative angular inclination between the rotor shaft and gearbox longitudinal axes. There may be a small tooth space/tooth clearance to permit assembly. Splines having such shapes may offer numerous advantages, including that the splines can accommodate the large bending moments and shear forces exerted on the rotor shaft by the rotor during use, and without transmitting (or reducing the transmission of) significant loads to the gearbox assembly causing resultant deflections. Alternatively, a torque transfer tube may be employed which is rotationally stiff, but which allow lateral flexibility to de-couple radial shaft distortion effects.

The primary drive element/flexible connector may have a first coupling component for coupling the drive element to the rotor shaft, and a second coupling component for coupling the drive element to the input shaft of the gearbox assembly. The first and second coupling components may be axially spaced apart along a length of the primary drive element, and the first coupling component may be located, in use, downwind of the second coupling element. A radial space or gap may be provided between an internal surface of the primary drive element proximate the first coupling component and the gearbox assembly. This may assist in reducing the transmission of radially directed loads from the rotor shaft into the gearbox assembly. In particular, the radial gap, and the space between the coupling elements, may permit deformation of the primary drive element whilst reducing the transmission of radial loads to the gearbox assembly. The primary drive element may be an annular element and may be a torsion tube. The first coupling element may be provided on or adjacent a downwind end of the torsion tube and the second coupling element on or adjacent an upwind end of the torsion tube.

The gearbox assembly may comprise:
an output shaft;
at least one gear stage having a plurality of planet gears positioned around the output shaft; and
a sun gear meshed with the planet gears and arranged to transfer torque to the output shaft;
in which:
the sun gear rotates in unison with the output shaft to thereby drive the output shaft;
the planet gears and the sun gear each comprise gear teeth which extend parallel to main axes of the gears, the planet gear teeth meshing with the sun gear teeth to transfer torque from the planet gears to the sun gear; and
the sun gear is a hollow annular component having a first axial end and a second axial end opposite the first end, the sun gear being mounted to or provided integrally with the output shaft at the first end such that, in use, torsion and radial deflection in the planet gears resulting in distortion of the planet gear teeth is accommodated by a corresponding distortion of the sun gear teeth.

The gear stage may comprise an annular gear meshed with the planet gears and arranged to transfer torque to the planet gears, the annular gear having a first axial end and a second axial end opposite the first end, the gearbox being arranged so that torque is transferred to the annular gear at the first axial end. Transferring the torque to the annular gear in this way can result in distortion or 'twisting' of the annular gear teeth in a direction around a circumference of the gear, which is known in the industry as 'wind-up', and radial mesh misalignment from the separating forces generated by torque transmission. So the distortion may be in the planet and annular gear teeth. This is transferred to the teeth of the planet gears and so to the sun gear teeth. The sun gear is typically a relatively thick-walled shaft, and so this results in misalignment between the planet and sun gear teeth, causing premature tooth wear. Providing the sun gear as an end driven, optionally thin walled annular component, allows this distortion to be accommodated by a corresponding distortion of the sun gear teeth, and avoids a requirement to provide complex tooth profiles on the planet and sun gear teeth or complex centre drive arrangements. In the context of the invention, references to an 'end driven' gear or gear component are to one in which torque is transferred to or from the gear/gear component at one axial end thereof.

The gearbox assembly may comprise a primary gear stage having a plurality of planet gears positioned around the output shaft, each planet gear rotatably mounted on a respective planet gear pin and arranged to transfer a drive force or load (torque) to the output shaft. The pins may be provided on a primary gear carrier, and may be coupled to or provided integrally with the gear carrier. The primary gear carrier may be arranged to) be secured against rotation, relative to a housing of the wind turbine, so that the pins are held in fixed positions within or relative to the rotor shaft cavity. The primary gear stage may comprise a sun gear meshed with the planet gears, the sun gear arranged to transfer a drive force or load from the planet gears to the gearbox assembly output shaft. The primary gear stage sun gear may be an annular gear positioned around the output shaft.

The gearbox assembly may comprise a secondary gear stage having a plurality of planet gears positioned around the output shaft, each planet gear rotatably mounted on a respective planet gear pin and arranged to transfer a drive force or load to the output shaft. The pins may be provided on a secondary gear carrier, and may be coupled to or provided integrally with the gear carrier. The secondary gear carrier may be coupled to or may define the input shaft of the gearbox assembly which meshes with the primary drive transfer element. The primary gear stage may comprise an input gear, which may be an annular gear, meshed with the primary planet gears and coupled to the input shaft for rotation therewith, to transfer at least part of the rotor load into the primary gear stage. The secondary gear carrier may be rotatable and may be arranged to rotate carrying the planet gear pins and planet gears in a circumferential path around the output shaft. The secondary gear stage may comprise a sun gear meshed with the planet gears and arranged to transfer a drive force or load from the planet gears to the gearbox assembly output shaft. The secondary gear stage sun gear may be mounted to or provided integrally with the output shaft. The sun gear may be an annular gear positioned around or on the output shaft.

The primary gear stage sun gear may be coupled to the secondary gear stage planetary gears, to transfer a drive force or load from the primary stage to the gearbox assembly output shaft. The secondary gear stage may comprise a drive transfer element, which may be an annular gear element, secured to the primary stage sun gear for rotation therewith, the drive transfer element meshed with the secondary planet gears.

The gearbox assembly may comprise at least one further gear stage having a plurality of planet gears positioned around the output shaft, each planet gear rotatably mounted on a respective planet gear pin and arranged to transfer a drive force or load to the output shaft. The output shaft of the gearbox assembly may comprise a first shaft part for transferring drive from the primary and secondary gear stages into a third gear stage, and a second part for transferring drive from the third stage to the generator. Alternatively the third gear stage may be arranged such that the drive force or load of the rotor shaft inputted to the gearbox assembly is split between the primary, secondary and third gear stages. The primary and secondary stages would be arranged to enable this triple torque split. The third gear stage may be arranged to perform a third speed increase/torque decrease on the load input to the third stage (which may be the output of the primary/secondary stages, or a combination of a portion of the rotor shaft load transferred directly into the third stage and the output of the primary/secondary gear stages). Further gear stages may be provided depending upon factors which may include the power generation capacity of a turbine carrying the drive arrangement, operating parameters of the generator and/or desired generator size/configuration.

The drive arrangement may comprise a primary load carrying member for releasably mounting the gearbox assembly to a housing of a wind turbine carrying the drive arrangement. The housing may comprise an internal chamber in which the rotor shaft is rotatably mounted, and the primary load carrying member may serve for releasably mounting the gearbox assembly at least partly within the chamber in such a way that the gearbox assembly is at least partly cantilevered from the housing. The primary load carrying member may be the gear carrier of the primary gear stage.

According to a fourth aspect of the present invention, there is provided a wind turbine comprising:
- a rotor;
- an electrical power generator; and
- a drive arrangement according to the first, second or third aspect of the invention, wherein the rotor shaft of the drive arrangement is coupled to the rotor and an output shaft of the gearbox is coupled to the generator, for transferring torque from the rotor to the generator to generate electrical power.

The wind turbine may comprise a housing containing the rotor shaft. The rotor may be rotatably mounted in and supported by the housing. This may provide the advantage that the gearbox assembly can be removed from within the cavity in the rotor shaft without requiring the rotor shaft to be supported following removal of the gearbox assembly. The primary stage gear carrier of the gearbox assembly may be coupled to the housing and thereby secured against rotation. In this way, reaction loads in the gearbox assembly may be transmitted to the housing. The turbine may comprise at least one pair of bearings for rotatably mounting and supporting the rotor shaft within the housing. The bearings may be taper roller bearings for supporting axially and/or radially directed loads exerted on the housing by the rotor shaft. The bearings may be axially staggered such that there is a spacing between the bearings. One bearing may be located closer to a downwind end of the rotor shaft and the other closer to an outboard upwind end, at which the rotor is coupled to the shaft. This may provide the advantage of reducing the bending moment load reaction on the bearing which is located closer to the downwind end of the rotor shaft.

Further features of the drive arrangement of the wind turbine of the fourth aspect of the invention are defined above in relation to the first, second and/or third aspect of the invention.

According to a fifth aspect of the present invention, there is provided a drive arrangement for a wind turbine, the drive arrangement comprising:
- a housing;
- a rotor shaft;
- a gearbox assembly for transferring torque from the rotor shaft to an electrical power generator; and
- a primary load carrying member for releasably mounting the gearbox assembly to the housing;
- wherein the housing comprises an internal chamber in which the rotor shaft is rotatably mounted;
- and wherein the primary load carrying member serves for releasably mounting the gearbox assembly at least partly within the chamber in such a way that the gearbox assembly is at least partly cantilevered from the housing.

The gearbox assembly may be at least partly cantilevered from the housing in that at least part of a static load of the gearbox assembly is supported by the housing in a cantilever fashion. This may provide the advantage that at least part of the static load of the gearbox is directly supported by the housing through the primary load carrying member, and not transmitted to the housing through gear components of the gearbox assembly. This may reduce wear/damage to gear components of the gearbox assembly. Typically a majority of a static load of the gearbox assembly will be supported from the housing. The primary load carrying member may serve for releasably mounting the gearbox assembly to the housing in such a way that the only static loading on gear components of the gearbox assembly is due to minor deflections of the load carrying member and/or housing resulting from the self-weight of the gearbox assembly.

The gearbox assembly may comprise a primary gear stage and a secondary gear stage, each comprising a plurality of planet gears positioned around the output shaft, each planet gear rotatably mounted on a respective planet gear pin and arranged to transfer a drive force or load to the gearbox assembly output shaft. The primary gear stage may be arranged to transfer its portion of the rotor shaft load to an output shaft of the gearbox assembly through the secondary gear stage. The primary gear stage may be arranged to perform a primary speed increase/torque decrease on the portion of the rotor load inputted to the primary stage. The secondary gear stage may be arranged to perform a secondary speed increase/torque decrease on the load inputted to the secondary stage, which may be a combination of a portion of the rotor shaft load transferred directly into the second stage, and the output of the primary gear stage.

Each planet gear of the primary gear stage may be rotatably mounted on a respective planet gear pin and arranged to transfer a drive force or load to the output shaft. The pins may be provided on the primary load carrying member, which may be a primary gear carrier, and may be coupled to or provided integrally with the gear carrier. The primary gear carrier may be arranged to be secured against rotation so that the pins are held in fixed positions within the chamber. The primary gear stage may comprise a sun gear meshed with the planet gears, the sun gear arranged to transfer a drive force or load from the planet gears to the gearbox assembly output shaft. The primary gear stage sun gear may be an annular gear positioned around the output shaft.

The drive arrangement may comprise a drive transfer mechanism for transferring the rotational drive force from the rotor shaft into the gearbox assembly. The rotor shaft may be at least partly hollow, having an internal cavity in which at least part of the gearbox assembly and the drive transfer mechanism are located. Further features of the drive arrangement, in particular the drive transfer mechanism and/or rotor shaft, are defined above in relation to the first, second and/or third aspect of the invention.

According to a sixth aspect of the present invention, there is provided a wind turbine comprising:
- a rotor;
- an electrical power generator; and
- a drive arrangement according to the fifth aspect of the invention, wherein the rotor shaft of the drive arrangement is coupled to the rotor and an output shaft of the gearbox is coupled to the generator, for transferring torque from the rotor to the generator to generate electrical power.

Further features of the drive arrangement of the wind turbine of the sixth aspect of the invention are defined above in relation to the fifth aspect of the invention.

Embodiments of the present invention will now be described, by way of example only, with reference to the accompanying drawings, in which.

Figure 1:
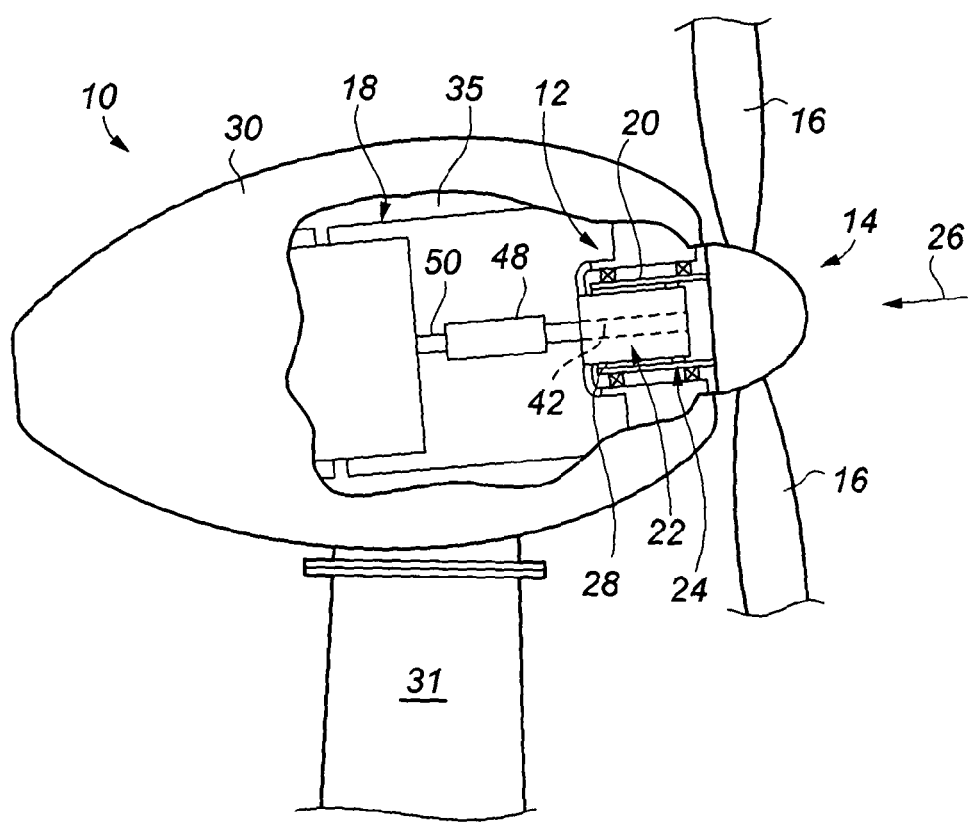
FIG. 1 is a partially cut-away schematic side view of a wind turbine, incorporating a drive arrangement, in accordance with an embodiment of the present invention.

Turning firstly to FIG. 1, there is shown a partially cutaway schematic side view of a wind turbine 10, incorporating a drive arrangement 12, in accordance with an embodiment of the present invention. The wind turbine 10 comprises a rotor 14 having three rotor blades, two of which are shown and each given the reference numeral 16. The wind turbine 10 also comprises an electrical power generator 18 and the drive arrangement 12. The drive arrangement 12 is coupled to the rotor 14 and the generator 18, and serves for transferring a rotational drive force (torque) from the rotor 14 to the generator 18 to generate electrical power.

The drive arrangement 12 generally comprises a rotor shaft 20 which is coupled to the rotor 14, a gearbox assembly indicated generally by reference numeral 22, and a drive transfer mechanism indicated generally by reference numeral 24. As is well known, the rotor shaft 20 is coupled to and rotated by the rotor 14, which is driven by a flow of air 26 impinging on the rotor blades 16. The gearbox assembly 22 serves for transferring a rotational drive force from the rotor shaft 20 to the generator 18. The rotational drive force of the rotor shaft 20 is inputted to the gearbox assembly 22 by means of the drive transfer mechanism 24.

The rotor shaft 20 is at least partly hollow, having an internal cavity 28 in which at least part of the gearbox assembly 22 and the drive transfer mechanism 24 are located. Providing a drive arrangement 12 including a rotor shaft 20 which is hollow, with a gearbox assembly 22 at least partly located in a cavity 28 in the shaft, offers numerous advantages over prior drive arrangements. In particular, the length of the drive arrangement 12 can be significantly reduced, compared to prior arrangements. It is also not necessary to provide large and heavy connecting components between the rotor shaft 20 and the gearbox assembly 22. These factors can lead to a reduction in the weight of the drive arrangement 12, and thus of a nacelle 30 carrying the drive arrangement 12 and provided at height on a wind turbine tower 31. Additionally, a reduction in the length of the drive arrangement 12 results in a reduction in the length of the nacelle 30, which may lead to reduced wind loading on the nacelle. This can lead to benefits in terms of a lighter tower design and smaller tower foundations. Furthermore, the rotor shaft 20 can be supported within the nacelle 30 in such a way that the gearbox assembly 22 can be more easily removed, for example for servicing. The invention may enable this to be achieved without requiring separate components, tooling or equipment to be provided for supporting the rotor shaft 20 following removal of the gearbox assembly 22.

Figure 3:
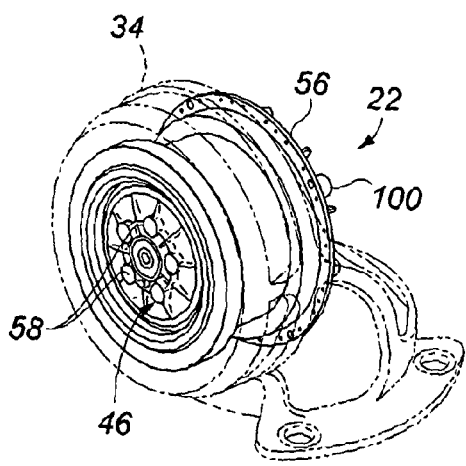
FIGS. 3 and 4 are perspective views taken from the front and behind, respectively, of a gearbox assembly forming part of the drive arrangement shown in FIGS. 1 and 2.
Figure 4:
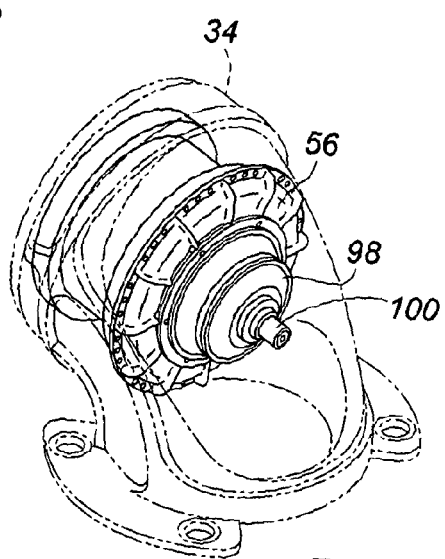

The drive arrangement 12 will now be described in more detail, with reference also to FIG. 2, which is a detailed cross-sectional side view of the drive arrangement. Reference is also made to FIGS. 3 and 4, which are perspective views taken from the front and behind, respectively, of the gearbox assembly 22 which forms part of the drive arrangement 12.

Figure 2:
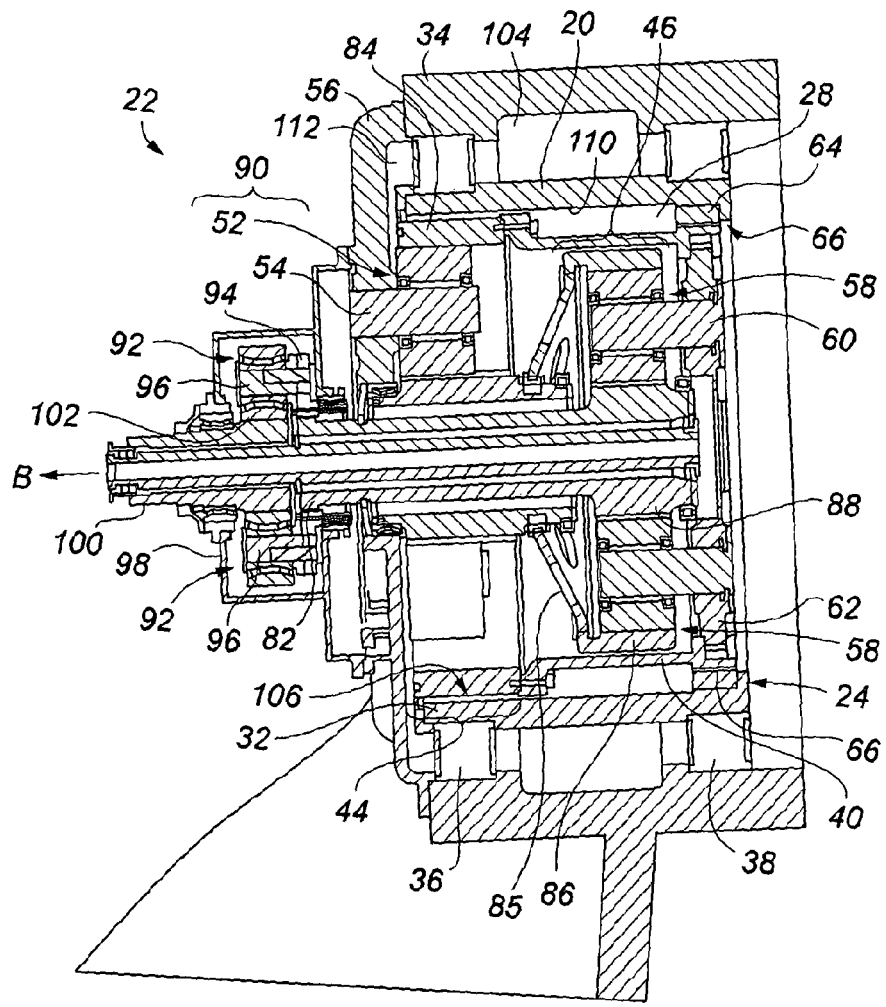
FIG. 2 is a detailed cross-sectional side view of the drive arrangement shown in FIG. 1.

FIG. 2 better illustrates the components of the gearbox assembly 22 and its positioning within the rotor shaft 20. Only part of the rotor shaft 20 is shown in the Figure. As can be seen, the cavity 28 extends in an axial direction from an downwind end 32 of the shaft. The rotor shaft 20 is mounted within a housing 34 which is coupled to a main frame 35 of the turbine 10. The main frame 35 supports the generator 18 and the rotor 14, and the nacelle 30 is fitted around the main frame. The rotor 20 is rotatably mounted within the housing 34 by means of a pair of bearings 36 and 38, which will typically be tapered roller bearings. The bearings 36 and 38 are capable of supporting axial and radial deflections resulting from the large multi-axis forces and bending moments exerted upon the rotor shaft 20 by the rotor 14. The bearings 36 and 38 are spaced axially along the rotor shaft 20, and the spacing between the bearings serves for mitigating some of the shear force effects and bending moments exerted upon the rotor shaft 20. In particular, the bearing 36 is positioned towards the downwind end 32 of the rotor shaft, and the bearing 38 towards an upwind end of the shaft (not shown) which supports the rotor 14. Positioning the bearing 36 towards the downwind end 32 has the effect of reducing radial deflections resulting from shear forces and bending moments exerted on the rotor shaft 20, and thereby reducing the transmission of deflections to the gearbox assembly 22 which otherwise can compromise the working alignment of gearbox components. In addition, the gearbox assembly 22 and the drive transfer mechanism 24 within the internal cavity 28 enables a lubrication system (not shown) for the gearbox to be used to lubricate the main shaft bearings 36 and 38, simplifying the overall lubrication system design for the turbine.

The gearbox assembly 22 is located such that a majority of the assembly is positioned within the rotor shaft cavity 28. The gearbox assembly 22 comprises an annular input shaft 40 which is coupled to the rotor shaft 20, and an output shaft which is indicated generally by reference numeral 42. The gearbox assembly 22 also comprises a primary gear stage 44 and a secondary gear stage 46. Drive is transferred from the rotor shaft 20 to the input shaft 40, through the primary and secondary gear stages 44 and 46 to the output shaft 42, and thence to the generator 18. A suitable shaft coupling 48 is provided between the generator output shaft 42 and an input shaft 50 of the generator 18 (FIG. 1), for transferring the torque or rotational power.

The primary gear stage 44 comprises a plurality of planet gears, two of which are shown and given the reference numerals 52. The primary planet gears 52 are each rotatably mounted upon respective pins 54, which are held captive in a primary gear stage carrier 56. The carrier 56 is mounted to the housing 34 using suitable bolts (not shown), to thereby secure the carrier against rotation relative to the housing. The pins 54 are therefore also secured against rotation relative to the housing 34, and so held in fixed positions within the rotor shaft cavity 28. The secondary gear stage 46 comprises a plurality of planet gears 58 which are best shown in FIG. 3. The secondary planet gears 58 are similarly mounted for rotation about respective pins, one of which is shown in FIG. 2 and given the reference numeral 60. The pins 60 are each held captive in a secondary gear stage carrier 62, which is rotatable within the rotor shaft cavity 28 to thereby carry the pins 60, and thus the planet gears 58, in a circumferential path around the output shaft 42.

Figure 5:
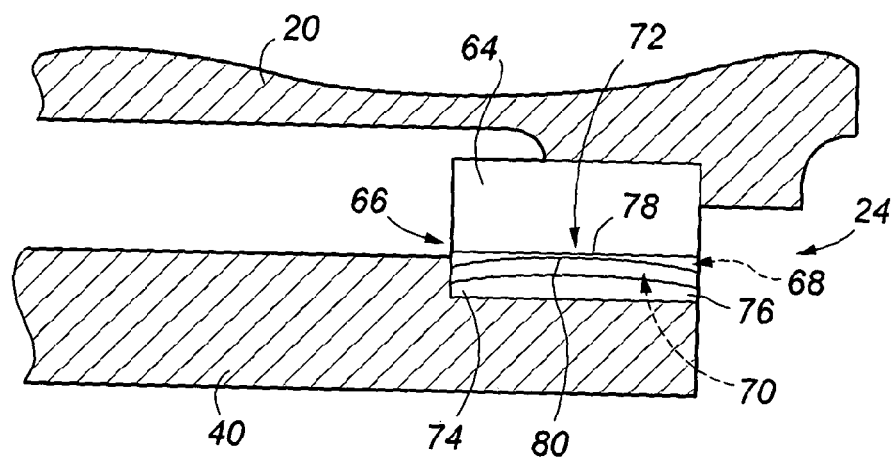
FIG. 5 is an enlarged view of a drive transfer mechanism forming part of the drive) arrangement shown in FIGS. 1 and 2.

The drive transfer mechanism 24 comprises a primary drive element 64 which is secured to the rotor shaft 20 using suitable bolts (not shown). Provision of the primary drive element 64 as a separate component secured to the rotor shaft facilitates replacement of the drive element in the event of wear, without requiring removal and/or replacement of the entire rotor shaft 20. A splined connection 66 is provided between the primary drive element 64 and the gearbox assembly input shaft 40, for transferring the rotational drive force from the rotor shaft 20 into the gearbox assembly 22. The primary drive element 64 is an annular component, and is best shown in the enlarged schematic view of FIG. 5. The splined connection 66 comprises female splines 68 provided on the annular drive element 64, and male splines 70 provided on the input shaft 40. The splines 68 and 70 extend axially along the length of the drive element 64 and the input shaft 40. The female splines 68 have a uniform height and shape. The male splines 70 in contrast taper from a central or mid-point 72 of the splines towards the downwind and upwind ends 74 and 76. The male splines 70 are thus "barrelled" (viewing in a radial direction) or "crowned" (viewing side-on). This shaping of the male splines 70 reduces wear of the splines 68 and 70 during use, under the operational torques and the deflections induced by the high bending moments and/or shear forces which can be exerted on the rotor shaft 20 by the rotor 14. Additionally, this shaping of the male splines 70 allows for a degree of such movement of the rotor shaft 20 whilst reducing or even avoiding any resultant deflection of the gearbox assembly 22. This reduces wear on components of the gearbox assembly 22, in particular the primary and secondary gear stages 44 and 46. Additionally, a spacing can be provided between a root 78 of the female splines 68 and a crest 80 of the male splines 70 at their mid-points 72. This provides for a degree of radial "play" in the engagement between the splines 68 and 70, to reduce or avoid the transmission of significant shear loads and/or bending moments into the gearbox assembly 22. It will be appreciated that the male splines 70 may alternatively be of uniform height and the female splines 68 barrelled.

The primary gear stage 44 additionally comprises a sun gear 82 which is rotatably mounted relative to the output shaft 42, and which meshes with the primary planet gears 52. An annular input gear 84 is coupled to and rotates with the input shaft 40, and meshes with the primary planet gears 52. Drive is transferred from the primary sun gear 82 to the planet gears 58 of the secondary gear stage 46 through a connecting member 85 and another annular input gear 86. The annular input gear 86 is meshed with the secondary planet gears 58, and thereby transfers the drive from the primary gear stage 44 to the secondary gear stage 46. The output shaft 42 forms a sun gear shaft having gear teeth 88 which mesh with the secondary planet gears 58. As will be described below, the summed inputs from the primary and secondary gear stages 44 and 46 are thus transferred to the output shaft 42.

The primary gear stage 44 is arranged to perform a primary speed increase/torque decrease on the portion of the rotor shaft 20 load inputted to the primary stage. The secondary gear stage 46 is arranged to perform a secondary speed increase/torque decrease on the load inputted to the secondary stage, which is a combination of a portion of the rotor shaft 20 load transferred directly into the second stage 46, and the output of the primary gear stage 44. This is achieved by appropriate dimensioning of the gear components of the primary and second gear stages 44 and 46.

The transfer of drive from the rotor shaft 20 to the output shaft 42 will now be described in more detail.

The rotor shaft 20 torque is split between the primary and second gear stages 44 and 46, in a desired ratio. The advantage to having the primary and secondary gear stages 44 and 46 is that a suitable speed increase/torque decrease can be achieved with an arrangement which is of smaller diameter and total weight than a single stage, which would require larger diameter planet gears.

Drive is transferred to the primary gear stage 44 through the primary drive element 64, splined connection 66 and input shaft 40. The input shaft 40 drives and rotates the annular input gear 84, thereby rotating the planet gears 52 about their respective pins 54. The portion of the rotor drive force transferred to the primary planet gears 52 is thus transferred to the primary sun gear 82. The connecting member 85 transfers this drive force to the secondary annular input gear 86 and thus on to the secondary planet gears 58.

The portion of the rotor 20 drive force transferred directly to the secondary gear stage 46 is transmitted through the primary drive element 64, splined connection 66 to the input shaft 40, and thence to the secondary gear carrier 62, which rotates with the input shaft. As explained above, the secondary gear pins 60 are captured in the carrier 62, and so rotated about the output shaft 42 with the carrier 62. The rotational speed of the secondary carrier 62 is different from that of the primary sun gear 82 and thus of the second annular input gear 86. In effect, the portions of the rotor 20 drive force transferred through the primary gear stage 44, and directly through the secondary gear stage 46, are thus summed and transferred to the output shaft 42 through the secondary planet gears 58 which are meshed with the output shaft gear teeth 88.

The output shaft 42 can be coupled directly to the generator 18 via the shaft coupling 48. However, the embodiment illustrated in FIG. 2 includes an additional, third gear stage 90. The third gear stage 90 provides a further speed increase/torque reduction prior to input of the rotor drive force to the generator 18. The third stage 90 is optional, and may not be required, depending upon factors including the rotor speed of the turbine 10 and the operating parameters of the generator 18. In the illustrated example, the turbine 10 is a multi-MW capacity turbine, and the third gear stage 90 provides a suitable speed increase/torque reduction for input of the rotor load to the generator 18, and is generally referred to as a "high speed" gear stage.

In the illustrated embodiment, the third gear stage 90 is provided externally of the rotor shaft 20, and indeed of the primary gear stage carrier 56. This facilitates removal of the third gear stage 90 for maintenance purposes. This is of particular utility, as it has been found in the past that it is the high speed gear stages which have a greater tendency to fail in wind turbine gearboxes. However, the gearbox assembly 22 may alternatively be arranged so that a third gear stage (not shown) is provided internally of the rotor shaft 20, with the drive from the primary and secondary gear stages 44 and 46 each directed through the third gear stage to the output shaft 42, in a similar way to which the drive force from the primary gear stage 44 is directed through the secondary gear stage 46 in the embodiment shown in FIG. 2.

The third gear stage 90 comprises a plurality of planet gears, two of which are shown and given the reference numeral 92. A gear carrier is mounted on the output shaft 42 for rotation with the shaft, and carries pins 96 on which the planet gears 92 are rotatably mounted. A third gear stage housing 98 is mounted to the primary stage gear carrier 56, and thus secured against rotation relative to the housing 34. An output shaft 100 is mounted for rotation within the third stage housing 98, and has sun gear teeth 102 which mesh with the planet gears 92. The drive force from the output shaft 42, comprising the summed outputs of the primary and secondary gear stages 44 and 46, is therefore directed through the gear carrier 94, pins 96, planet gears 92 and sun gear teeth 102 to the output shaft 100. The arrangement of the planet gears 92/sun gear teeth 102 perform the required speed increase/torque reduction. The output shaft 100 is coupled to the generator 18 through the shaft coupling 48, to transfer the torque or drive power to the generator.

FIG. 2 also illustrates features of the drive arrangement 12 which concern the way in which the gearbox assembly 22 is mounted within the housing 34. Specifically and as discussed above, the primary gear stage carrier 56 is mounted and secured against rotation relative to the gearbox housing 34. The primary gear stage carrier 56 effectively forms a primary load carrying member for releasably mounting the gearbox assembly 22 to the) housing 34. In the illustrated embodiment, the gearbox assembly 22 is located within the cavity 28 in the rotor shaft 20. However, in a variation on the illustrated embodiment, the gearbox assembly 22 may simply be located in an internal chamber 104 defined by the housing 34, and secured to the rotor shaft 20 in a more conventional fashion. The rotor shaft 20 may therefore be substantially solid, and a shaft coupling, similar to the coupling 48 shown in FIG. 1, may be utilised to connect the rotor shaft to the gearbox assembly.

The primary load carrying member 56 serves for releasably mounting the gearbox assembly 22 at least partly within the internal chamber 104. In this way, at least the output shaft 42 and primary and secondary gear stages 44 and 46 are mounted within the rotor shaft 20 as a single unit. In practice, the entire gearbox assembly 22 is located within the rotor as a single unit. The primary load carrying member 56 thus facilitates removal of the gearbox assembly as a unit, for maintenance purposes or otherwise. Further, this integrated mounting of the gearbox assembly 22 to the housing 34, which forms the nacelle mainframe, is such that the two move almost in unison under non-torque loadings (shear and bending). This is a significant advantage as regards gear mesh alignment, resulting in lower average contact stresses, better gear life and bearing load distribution.

The primary load carrying member 56 may serve for mounting the gearbox assembly 22 in such a way that the gearbox assembly is at least partly cantilevered from the housing 34. This is facilitated by the floating coupling provided by the splined connection 66 between the primary drive element 64 and the gearbox assembly input shaft 40. Any radial deflections resulting from a static load of the gearbox 22 can be accounted for by providing a suitable tolerance in the fit between the male and female splines 70, 68.

Additionally and as shown in FIG. 2, there is a radial gap or clearance 106 between an external surface 108 of the annular input gear 84 and an internal surface 110 of the rotor shaft 20. This radial gap 106 provides the drive arrangement 12 with a degree of freedom to move, to account for rotor shaft 20 deflections, during use. Also, a portion 112 of the housing internal chamber 104 is filled with a suitable oil-based lubricant. Optionally, lubricant can be provided in the clearance 106 to give a damping effect during operation of the gearbox, to mitigate vibration.

Whilst the gearbox assembly 22 is ideally in a floating cantilever mounting as described above, it will be understood that at least a portion of a static load of the gearbox assembly 22 may be transmitted to the housing 34 otherwise than through the primary load carrying member 56. The splined connection 66 may be designed such that the male and female splines 70 and 68 come into contact to support said portion of the static load of the gearbox assembly 22. This is generally preferred to any contact between elements of the primary or indeed secondary gear stages 44 and 46, as the primary drive element 64 and/or input shaft 40 are more easily removed for replacement or maintenance in the event of damage to the respective splines 68, 70.

The cantilever mounting of the gearbox assembly 22 within the housing 34 also facilitates removal of the gearbox assembly for maintenance purposes. This is achieved by firstly disconnecting the output shaft 100 from the generator 18, by releasing the shaft coupling 48. The coupling 48 is removed, to provide sufficient clearance for the gearbox assembly 22 to be backed-out from the housing 34. The gearbox assembly 22 is supported using suitable hoisting or lifting equipment (not shown), and bolts which secure the primary load carrying member 56 to the housing 34 are then released. The gearbox assembly 22 can then be slid out of the housing 34 in the direction of the arrow B (FIG. 2). This provides access to the gearbox assembly 22 for maintenance in-situ, or alternatively the ability to remove the gearbox assembly from the turbine 10, if required.

Figure 6:
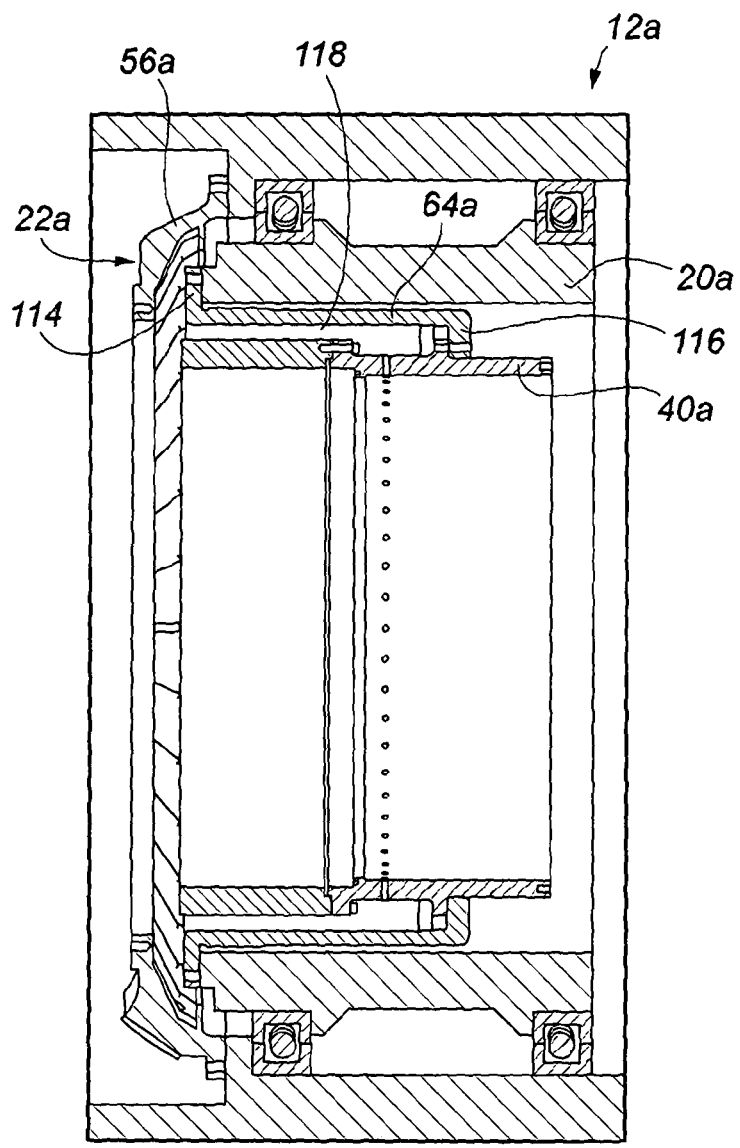
FIG. 6 is a detailed cross-sectional side view of a drive arrangement of a wind turbine in accordance with an alternative embodiment of the present invention.

Turning now to FIG. 6, there is shown a detailed cross-sectional side view of a drive arrangement of a wind turbine in accordance with an alternative embodiment of the present invention, the drive arrangement indicated generally by reference numeral 12a. The drive arrangement has a utility in the wind turbine 10 shown in FIG. 1, and is of very similar construction to the drive arrangement 12 shown in FIGS. 2 to 5. Accordingly, only the differences between the drive arrangement 12a and the drive arrangement 12 will be described herein. Like components share the same reference numerals with the addition of the suffix 'a'.

The drive arrangement 12a generally comprises a rotor shaft 20a which is coupled to the turbine rotor 14, a gearbox assembly indicated generally by reference numeral 22a, and a drive transfer mechanism indicated generally by reference numeral 24a. The substantive difference between the drive arrangement 12a and that of FIGS. 2 to 5 is in the structure of the drive transfer mechanism 24a. In this embodiment, the drive transfer mechanism 24a comprises a primary drive element in the form of an annular torsion tube 64a, which is a concentric sleeve, torsionally of high stiffness but with relatively low lateral (shear) stiffness. This member is used to support the mass of the main rotating elements of the gearbox 22a at their combined Centre of Gravity Location, giving neutral support under inertial loadings induced by tower movements. The lateral flexibility aids in the decoupling of rotor shaft radial deflections from the gearbox.

In more detail, the torsion tube 64a has a first coupling component 114 for coupling the tube to the rotor shaft 20a, and a second coupling component 116 for coupling it to an input shaft 40a of the gearbox assembly. The first and second coupling components 114, 116 are flanges formed on the torsion tube 64a, and are axially spaced apart along a length of the tube. The first coupling flange 114 is located downwind of the second coupling flange 116. Also, a radial space or gap 118 exists between an internal surface of the torsion tube 64a and the gearbox assembly, and extends from a location proximate the first coupling flange 114 along a length of the tube towards the second coupling flange 116. This assists in reducing the transmission of radially directed loads from the rotor shaft 20a into the gearbox assembly 22a. In particular, the radial gap 118, and the space between the coupling flanges 114 and 116, permits deformation of the torsion tube 64a whilst reducing the transmission of radial loads to the gearbox assembly 22a.

Bolts that attach the torsion tube (or coupling sleeve) 64a described above also require removal (through several, at least three or more, tooling access ports in an aft face of a primary gear stage carrier 56a. The rotor shaft 20a would be 'inched' around to provide access to all the bolts. Shaft torque will be low as the blades would be pitched. The rotor shaft 20a would be locked at the upwind end during the removal of the bolts that is, the access ports to get to the bolts would be angularly timed to a main rotor lock disc attached to the rotor shaft. Alternatively, the bolts at the upwind end of the sleeve 64a could be removed from access to the rotor hub space.

Figure 7:
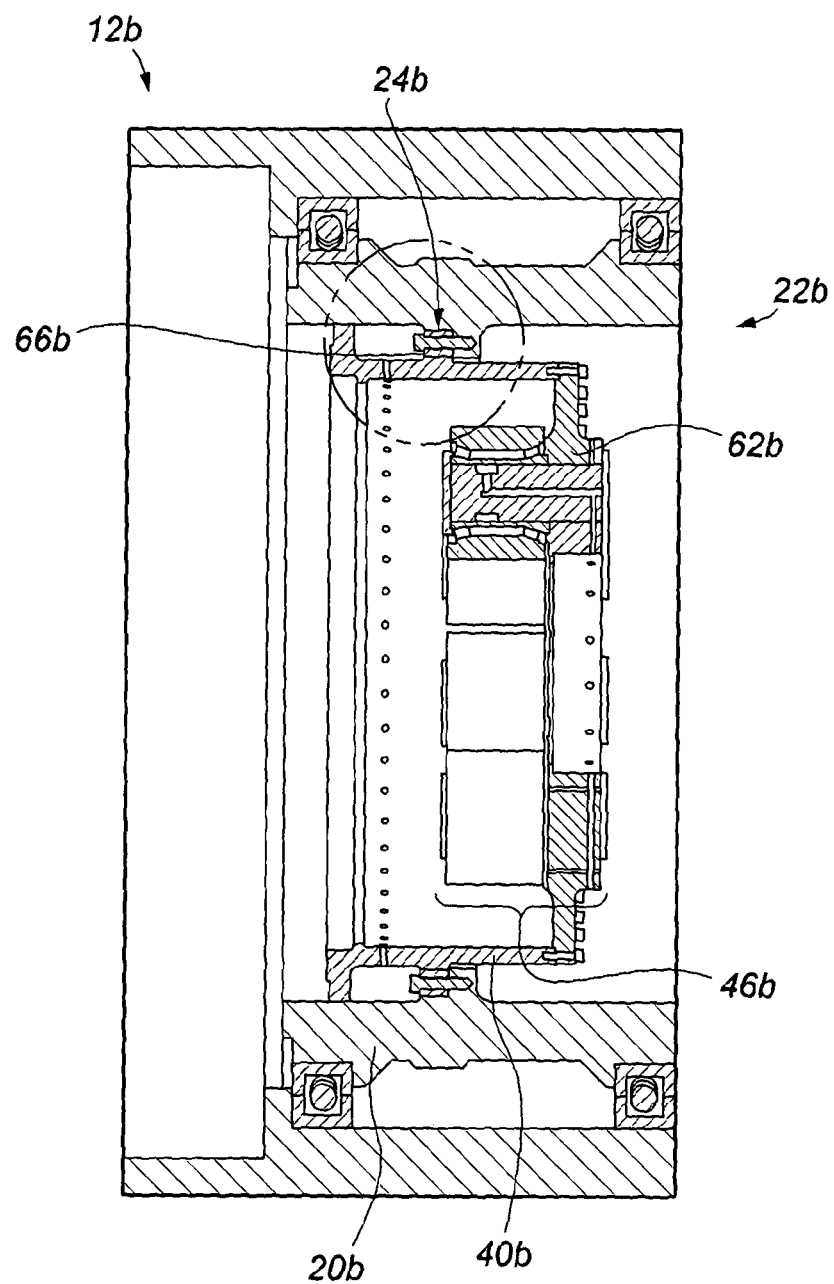
FIG. 7 is a detailed cross-sectional side view of part of a drive arrangement of a wind turbine in accordance with a further embodiment of the present invention.

Turning now to FIG. 7, there is shown a detailed cross-sectional side view of part of a drive arrangement of a wind turbine in accordance with another embodiment of the present invention, the drive arrangement indicated generally by reference numeral 12b. The drive arrangement has a utility in the wind turbine 10 shown in FIG. 1, and is of very similar construction to the drive arrangement 12 shown in FIGS. 2 to 5. Accordingly, only the differences between the drive arrangement 12b and the drive arrangement 12 will be described herein. Like components share the same reference numerals with the addition of the suffix 'b'.

Figure 8:
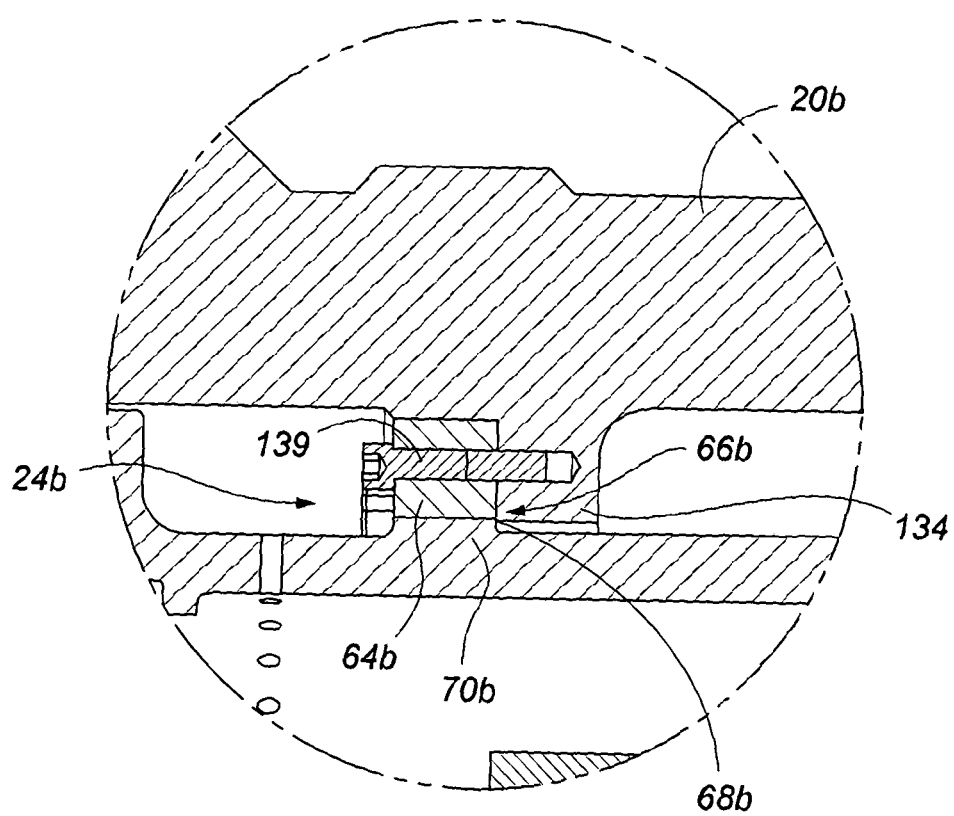
FIG. 8 is an enlarged view of a drive transfer mechanism forming part of the drive arrangement shown in FIG. 7.
Figure 12:
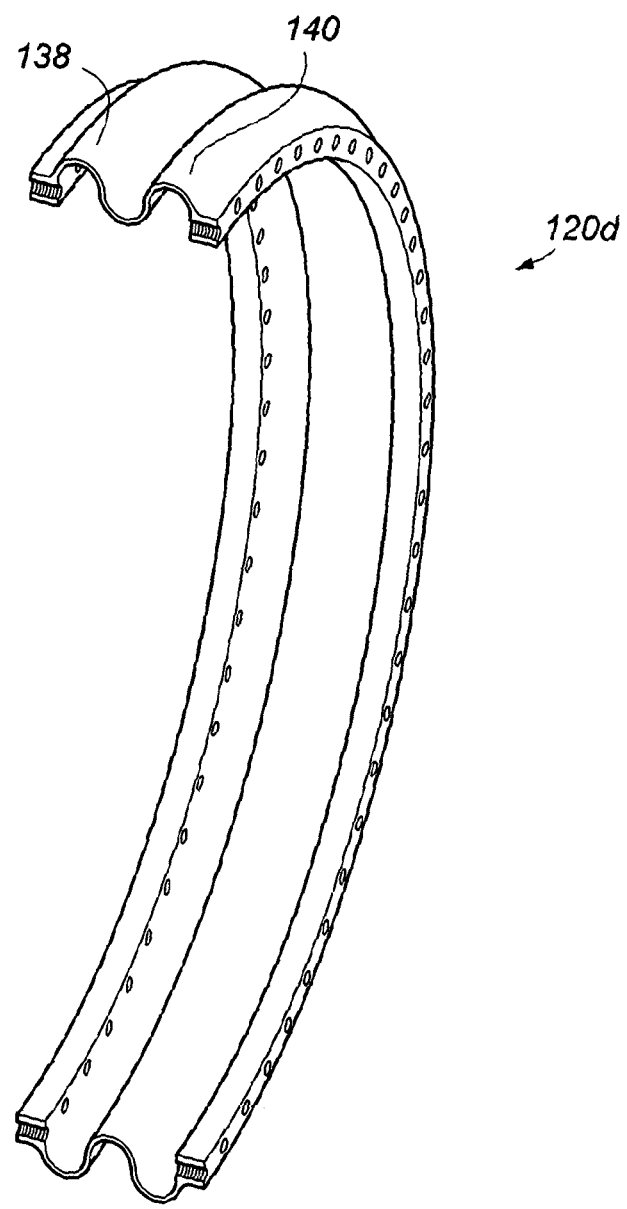
FIG. 12 is a perspective view showing a flexible connector forming part of the drive transfer mechanism shown in FIGS. 10 and 11, sectioned as shown in FIG. 10.

The drawing shows a gearbox assembly 22b which comprises primary and secondary gear stages, but only the secondary gear stage 46b is shown in the drawing, for ease of illustration. A drive transfer mechanism 24b comprises a splined connection 66b, better shown in the enlarged view of FIG. 8, which transfers torque between a rotor shaft 20b and an annular input shaft 40b of the gearbox assembly 22b. The splined connection 66b comprises female splines 68b provided on an annular drive element (or rotor housing coupling) 64b, and male splines 70b provided on the input shaft 40b. The annular drive element 64b is secured to a shoulder 134 on the rotor shaft 20b via a series of bolts, one shown and given the reference numeral 139. The female splines 68b have a uniform height and shape, and the male splines 70b are "barrelled" (although the reverse may equally be the case). In this embodiment, the splined connection 66b is provided further downwind of a secondary gear stage carrier 62b coupled to the input shaft 40b, preferably over the gearbox assembly unsprung mass centre of gravity. This helps to neutralise self weight gravity loads causing extraneous gear mesh loading. A flexible membrane coupling (not shown) can be positioned upwind of the splined connection 66b to locate the input shaft 40b, secondary planet gear carrier 62b, and seal the oil space. A suitable such coupling is that shown in FIG. 12, and which will be described below.

Figure 9:
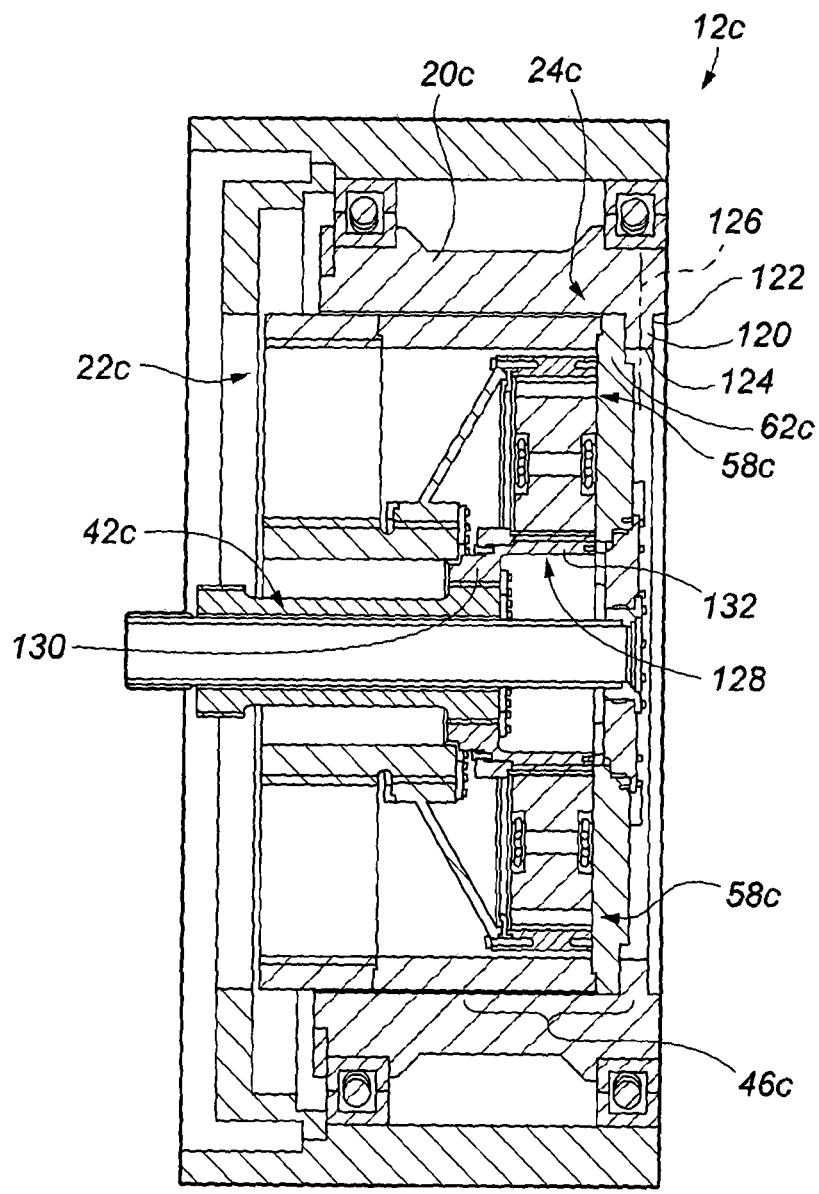
FIG. 9 is a detailed cross-sectional side view of a drive arrangement of a wind turbine in accordance with a further embodiment of the present invention

Turning now to FIG. 9, there is shown a detailed cross-sectional side view of a drive arrangement of a wind turbine in accordance with another embodiment of the present invention, the drive arrangement indicated generally by reference numeral 12c. The drive arrangement has a utility in the wind turbine 10 shown in FIG. 1, and is of very similar construction to the drive arrangement 12 shown in FIGS. 2 to 5. Accordingly, only the differences between the drive arrangement 12c and the drive arrangement 12 will be described herein. Like components share the same reference numerals with the addition of the suffix 'c'.

In this embodiment, a drive transfer mechanism 24 is shown which comprises a flexible connector in the form of a circumferential flange 120 which extends between a rotor shaft 20c and the gearbox assembly 22c, for transferring torque from the shaft to the gearbox assembly. The flexible connector 120 is provided integrally with the rotor shaft 20c, and extends from the shaft at 122 towards the gearbox assembly 22c. The flexible connector 120 has a free end 124 which is secured to the gearbox assembly 22c, specifically to a gear carrier 62c of a secondary gear stage 46c. The flexible connector 120 is elastically deformable such that, in use, it deflects or bends about an axis 126, to reduce the transmission of rotor bending and shear loads into the gearbox assembly 22c. The flexible connector 120 is capable of supporting distortions of the rotor shaft 20c relative to the gearbox assembly 22c of at least around 0.1°, optionally up to around 0.15°, optionally up to 0.2° or greater.

The gearbox assembly 22c includes an output shaft 42c and a sun gear 128 which is secured to the output shaft so that it rotates in unison with it, to thereby drive the output shaft. Planet gears 58c of the secondary stage 46c, and the sun gear 128, each comprise gear teeth (not shown) which extend parallel to main axes of the gears, the planet gear teeth meshing with the sun gear teeth to transfer torque from the planet gears to the sun gear. The sun gear 128 is a hollow annular component having a first axial end 130 and a second axial end 132 opposite the first end. The sun gear 128 is mounted to (or optionally provided integrally with) the output shaft 42c at the first end 130 via a hollow sleeve 132 mounted around the output shaft. In this way, torsion in the planet gears 58c resulting in distortion of the planet gear teeth is accommodated by a corresponding distortion of the sun gear teeth. The amount of distortion permitted will depend upon factors such as a wall thickness of the sun gear 128 and materials used. Providing the sun gear 128 as an annular component allows the distortion to be accommodated by a corresponding distortion of the sun gear teeth, and avoids a requirement to provide complex tooth profiles on the planet and sun gear teeth or a centre drive arrangement.

Figure 10:
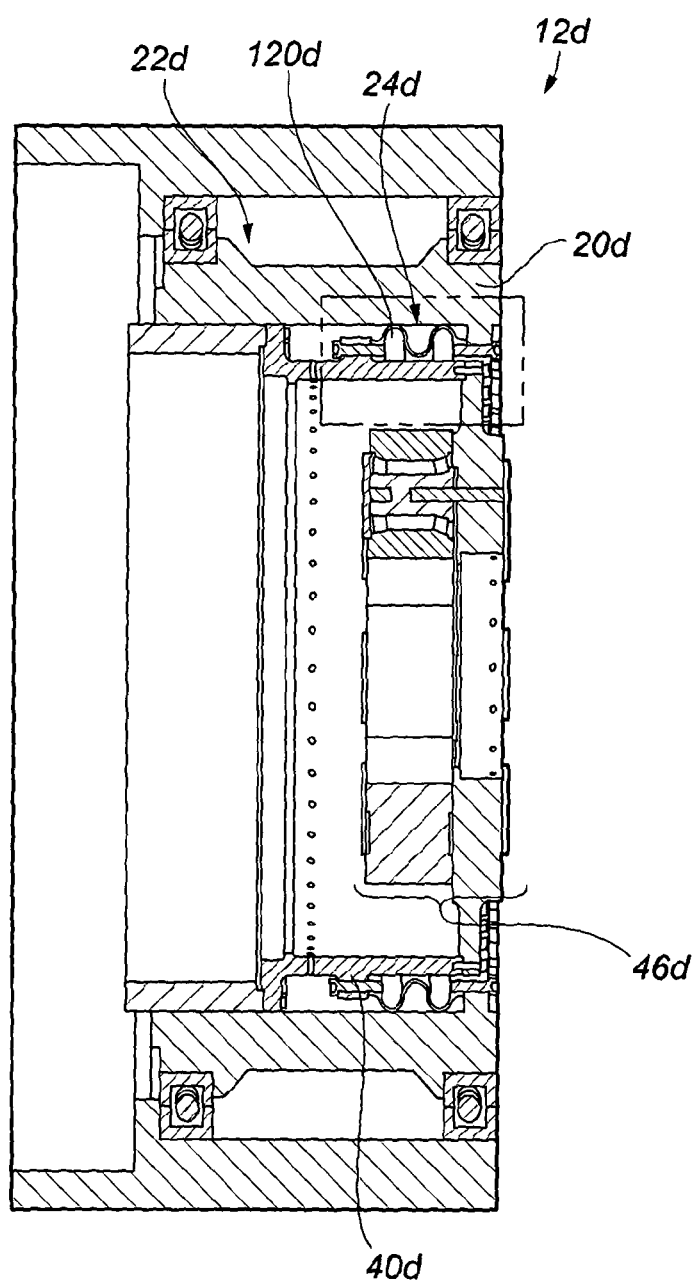
FIG. 10 is a detailed cross-sectional side view of part of a drive arrangement of a wind turbine in accordance with a further embodiment of the present invention.

Turning now to FIG. 10, there is shown a detailed cross-sectional side view of part of a drive arrangement of a wind turbine in accordance with an alternative embodiment of the present invention, the drive arrangement indicated generally by reference numeral 12d. The drive arrangement has a utility in the wind turbine 10 shown in FIG. 1, and is of very similar construction to the drive arrangement 12 shown in FIGS. 2 to 5. Accordingly, only the differences between the drive arrangement 12d and the drive arrangement 12 will be described herein. The drive arrangement 12d is most similar to the drive arrangement 12c shown in FIG. 9. Like components with the arrangements 12 and 12c share the same reference numerals with the addition of the suffix 'd' or with the suffix 'c' replaced accordingly.

Figure 11:
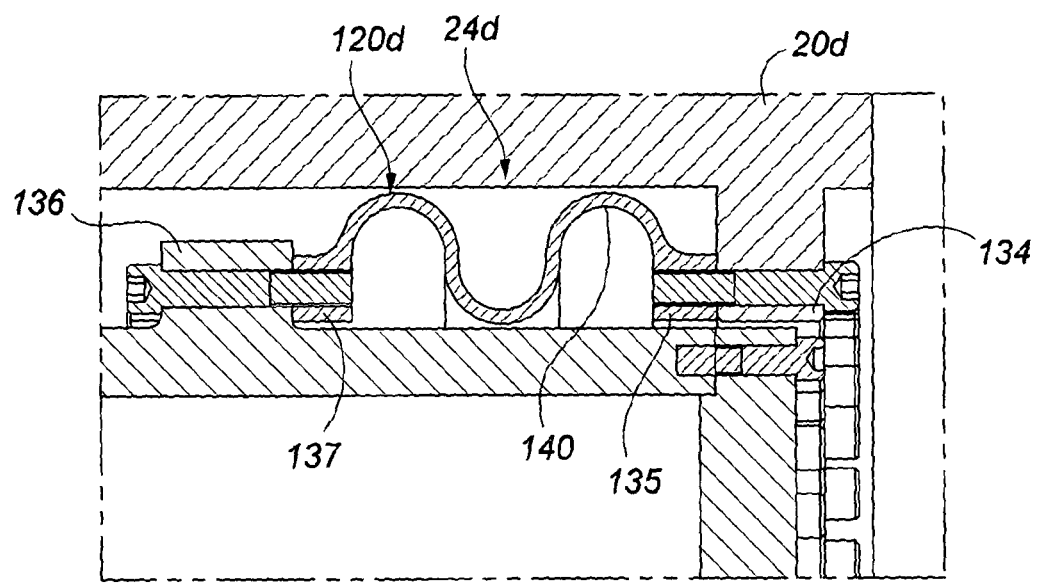
FIG. 11 is an enlarged view of a drive transfer mechanism forming part of the drive arrangement shown in FIG. 11.

The drawing shows a gearbox assembly 22d which comprises primary and secondary gear stages, but only the secondary gear stage 46d is shown in the drawing, for ease of illustration. In this embodiment a drive transfer mechanism 24d comprises a flexible connector 120d which is corrugated, and which is better shown in the enlarged view of FIG. 11 and the perspective view of FIG. 12 (sectioned as shown in FIG. 10). The connector 120d extends in an axial direction between a mounting shoulder 134 on the rotor shaft 20d and a shoulder 136 on an annular input shaft 40d of gearbox assembly 22d. The connector 120d is secured to the shoulder 134 at a first axial end 135, and to the shoulder 136 at a second axial end 137. Corrugations 138 and 140 of the connector 120d can deform during use, to reduce transmission of rotor 20d shear and bending loads into the gearbox assembly 22d. The flexible connector 120d also facilitates sealing of the gearbox assembly to prevent oil leakage. Again, the flexible connector 120d is capable of supporting distortions of the rotor shaft 20d relative to the gearbox assembly 22d within the range discussed above.

Various modifications may be made to the foregoing without departing from the spirit or scope of the present invention.

For example, the gearbox assembly may comprise any required number of gear stages, according to factors including the capacity of the wind turbine and operating parameters of the generator. Each gear stage in the gearbox assembly may comprise any suitable number of planet gears.

The gearbox assembly may be entirely located within the cavity in the rotor shaft. The only part of the gearbox assembly protruding from the cavity may be the output shaft. Part of the gearbox assembly may protrude from the cavity to a greater or lesser extent than is shown in FIG. 2.

Tapered roller bearings are described, but any suitable bearing arrangement may be provided between the rotor shaft and the housing.

The invention claimed is:

1. A drive arrangement for a wind turbine, the drive arrangement comprising:
    a rotor shaft;
    a gearbox assembly for transferring torque from the rotor shaft to an electrical power generator, the gearbox assembly comprising:
        an input shaft;
        an output shaft;
        a primary gear stage; and
        a secondary gear stage;
        each gear stage having a plurality of planet gears positioned around the output shaft, an annular gear meshed with the planet gears, and a sun gear meshed with the planet gears and arranged to transfer torque to the output shaft;
    a drive transfer mechanism for transferring torque from the rotor shaft into the gearbox assembly via the input shaft; and
    a primary load carrying member for releasably mounting the gearbox assembly to a housing of the wind turbine;
    wherein the rotor shaft is at least partly hollow, having an internal cavity in which at least part of the gearbox assembly and at least part of the drive transfer mechanism are located;
    and wherein the gearbox assembly comprising the input shaft, output shaft, primary and secondary gear stages is mountable within the rotor shaft as a single unit by means of the primary load carrying member.

2. A drive arrangement as claimed in claim 1, in which the gearbox assembly is arranged within the rotor shaft such that a radial gap exists between an internal surface of the rotor shaft and an external surface of the annular gear of the primary gear stage, to provide the drive arrangement with a degree of freedom to move, to account for rotor shaft deflections during use.

3. A drive arrangement as claimed in claim 1, in which:
    the secondary stage sun gear rotates in unison with the output shaft to thereby drive the output shaft;
    the secondary planet gears and sun gear each comprise gear teeth which extend parallel to main axes of the gears, the planet gear teeth meshing with the sun gear teeth to transfer torque from the planet gears to the sun gear; and
    the secondary sun gear is a hollow annular component having a first axial end and a second axial end opposite the first end, the sun gear being mounted to or provided integrally with the output shaft at the first end such that, in use, torsion and radial deflection in the planet gears resulting in distortion of the planet gear teeth is accommodated by a corresponding distortion of the sun gear teeth.

4. A drive arrangement as claimed in claim 1, in which the primary load carrying member serves for releasably mounting the gearbox assembly at least partly within the chamber in such a way that the gearbox assembly is at least partly cantilevered from the housing.

5. A drive arrangement as claimed in claim 1, in which the planet gears of the primary gear stage are each rotatably mounted on a respective planet gear pin, the pins provided on a primary gear carrier which forms the primary load carrying member.

6. A drive arrangement as claimed in claim 1, in which the drive transfer mechanism comprises a flexible connector extending between the rotor shaft and the gearbox assembly for transferring torque from the rotor shaft into the gearbox assembly, the flexible connector being elastically deformable such that, in use, it permits distortions of the rotor shaft relative to the gearbox assembly resulting from rotor bending or shear loads of at least 0.1°, to thereby reduce the transmission of said loads into the gearbox assembly.

7. A drive arrangement as claimed in claim 6, in which the flexible
    connector has a first end and a second end opposite the first end, and is secured to the
    rotor shaft at the first end and to the gearbox assembly at the second end.

8. A drive arrangement as claimed in claim 6, in which the flexible connector is provided integrally with the rotor shaft and extends from the shaft towards the gearbox assembly, the flexible connector having a free end which can be coupled to the gearbox assembly.

9. A drive arrangement as claimed in claim 6, in which the flexible connector is elastically deformable such that, in use, it deflects about a main axis to reduce the transmission of the rotor bending and shear loads into the gearbox assembly.

10. A drive arrangement as claimed in claim 6, in which the flexible connector is capable of supporting said distortions of the rotor shaft relative to the gearbox assembly, the distortions being up to and including 0.2°.

11. A drive arrangement as claimed in claim 6, in which the flexible connector is a flange extending in a radial direction from the rotor shaft towards the gearbox assembly.

12. A drive arrangement as claimed in claim 6, in which the flexible connector is corrugated, and extends in an axial direction between mounting shoulders on the rotor shaft and the gearbox assembly, corrugations of the connector deforming to reduce transmission of the rotor loads into the gearbox assembly.

13. A drive arrangement as claimed in claim 1, in which the drive transfer mechanism comprises a primary drive element for connecting the rotor shaft to the gearbox assembly, to transfer the torque from the rotor shaft into the gearbox assembly.

14. A drive arrangement as claimed in claim 13, in which the input shaft can be coupled to the primary drive element, the input shaft being arranged to transfer the drive force from the primary drive element into the primary and secondary gear stages, the primary drive element and the input shaft coupled together in a floating connection.

15. A drive arrangement as claimed in claim 13, in which the drive transfer mechanism comprises a splined connection for transferring a rotational drive force from the rotor shaft into the gearbox assembly, the splined connection comprising axially extending male splines provided on one of the input shaft and the primary drive element, and axially extending female splines provided on the other of the input shaft and the primary drive element and which mesh with the male splines.

16. A drive arrangement as claimed in claim 15, in which the male splines are crowned.

17. A drive arrangement as claimed in claim 15, in which one or both of the male and female splines taper in directions from a mid-portion of the splines towards each end of the splines.

18. A drive arrangement as claimed in claim 13, in which the primary drive element has a first coupling component for coupling the drive element to the rotor shaft, and a second coupling component for coupling the drive element to the input shaft of the gearbox assembly, the first and second coupling components axially spaced apart along a length of the primary drive element, and the first coupling component located, in use, downwind of the second coupling element.

19. A drive arrangement as claimed in claim 18, in which a radial space is provided between an internal surface of the primary drive element proximate the first coupling component and the gearbox assembly, to reduce the transmission of radially directed displacements from the rotor shaft into the gearbox assembly.

20. A drive arrangement as claimed in claim 18, in which the primary drive element is an annular torsion tube, the first coupling element provided on or adjacent a downwind end of the torsion tube and the second coupling element on or adjacent an upwind end of the torsion tube.

21. A drive arrangement for a wind turbine, the drive arrangement comprising:
a rotor shaft;
a gearbox assembly for transferring torque from the rotor shaft to an electrical power generator; and
a drive transfer mechanism comprising a flexible connector extending between the rotor shaft and the gearbox assembly for transferring torque from the rotor shaft into the gearbox assembly;
wherein the rotor shaft is at least partly hollow, having an internal cavity in which at least part of the gearbox assembly and at least part of the drive transfer mechanism are located;
and wherein the flexible connector is elastically deformable such that, in use, it permits distortions of the rotor shaft relative to the gearbox assembly resulting from rotor bending or shear loads of at least 0.1°, to thereby reduce the transmission of said loads into the gearbox assembly.

22. A drive arrangement as claimed in claim 21, in which the flexible connector has a first end and a second end opposite the first end, and is secured to the rotor shaft at the first end and to the gearbox assembly at the second end.

23. A drive arrangement as claimed in claim 21, in which the flexible connector is provided integrally with the rotor shaft and extends from the shaft towards the gearbox assembly, the flexible connector having a free end which can be coupled to the gearbox assembly.

24. A drive arrangement as claimed in claim 21, in which the flexible connector is elastically deformable such that, in use, it deflects about a main axis to reduce the transmission of rotor bending and shear loads into the gearbox assembly.

25. A drive arrangement as claimed in claim 21, in which the flexible connector is capable of supporting distortions of the rotor shaft relative to the gearbox assembly of up to and including 0.2°.

26. A drive arrangement as claimed in claim 21, in which the flexible connector is a flange extending in a radial direction from the rotor shaft towards the gearbox assembly.

27. A drive arrangement as claimed in claim 21, in which the flexible connector is corrugated, and extends in an axial direction between mounting shoulders on the rotor shaft and the gearbox assembly, corrugations of the connector deforming to reduce transmission of the rotor loads into the gearbox assembly.

28. A drive arrangement as claimed in claim 21, in which the gearbox assembly is arranged within the rotor shaft such that a radial gap exists between an internal surface of the rotor shaft and an external surface of an annular gear of a gear stage of the gearbox assembly, to provide the drive arrangement with a degree of freedom to move, to account for rotor shaft deflections during use.

29. A wind turbine comprising:
a rotor;
a housing;
an electrical power generator; and
a drive arrangement comprising:
    a rotor shaft;
    a gearbox assembly for transferring torque from the rotor shaft to the electrical power generator, the gearbox assembly comprising:
        an input shaft;
        an output shaft;
        a primary gear stage; and
        a secondary gear stage;
        each gear stage having a plurality of planet gears positioned around the output shaft, an annular gear meshed with the planet gears, and a sun gear meshed with the planet gears and arranged to transfer torque to the output shaft;
    a drive transfer mechanism for transferring torque from the rotor shaft into the gearbox assembly via the input shaft; and
    a primary load carrying member for releasably mounting the gearbox assembly to the housing of the wind turbine;
    wherein the rotor shaft is at least partly hollow, having an internal cavity in which at least part of the gearbox assembly and at least part of the drive transfer mechanism are located;
    and wherein the gearbox assembly comprises the input shaft, the output shaft, and the primary and secondary gear stages, wherein the primary and secondary gear stages are mountable within the rotor shaft as a single unit by means of the primary load carrying member;
    wherein the rotor shaft of the drive arrangement is coupled to the rotor and the output shaft of the gearbox assembly is coupled to the generator, for transferring torque from the rotor to the generator to generate electrical power.

30. A wind turbine comprising:
a rotor;
an electrical power generator; and
a drive arrangement comprisinq:
    a rotor shaft;
    a gearbox assembly for transferring torque from the rotor shaft to the electrical power generator, the gearbox assembly having an output shaft; and
    a drive transfer mechanism comprisinq a flexible connector extending between the rotor shaft and the gearbox assembly for transferring torque from the rotor shaft into the gearbox assembly;
    wherein the rotor shaft is at least partly hollow, having an internal cavity in which at least part of the gearbox assembly and at least part of the drive transfer mechanism are located;
    and wherein the flexible connector is elastically deformable such that, in use, it permits distortions of the rotor shaft relative to the gearbox assembly resulting from rotor bending or shear loads of at least 0.1°, to thereby reduce the transmission of said loads into the gearbox assembly;
wherein the rotor shaft of the drive arrangement is coupled to the rotor and the output shaft of the gearbox assembly is coupled to the generator, for transferring torque from the rotor to the generator to generate electrical power.

* * * * *